UNITED STATES PATENT OFFICE.

THOMAS B. ALLEN, OF NIAGARA FALLS, NEW YORK, ASSIGNOR TO THE CARBORUNDUM COMPANY, OF NIAGARA FALLS, NEW YORK, A CORPORATION OF PENNSYLVANIA.

METHOD OF TREATING ELECTROMETALLURGICAL PRODUCTS.

1,001,572. Specification of Letters Patent. Patented Aug. 22, 1911.

No Drawing. Application filed January 28, 1911. Serial No. 605,329.

*To all whom it may concern:*

Be it known that I, THOMAS B. ALLEN, a resident of Niagara Falls, in the county of Niagara and State of New York, have invented a new and useful Improvement in Methods of Treating Electrometallurgical Products, of which the following is a full, clear, and exact description.

My invention relates to the manufacture of electrometallurgical products and their after treatment, particularly those used for abrasive and refractory purposes.

The object of the invention is to remove certain impurities which impair or destroy to a large extent the bonding qualities of such products when made up with binders into commercial articles. The method is applicable to a large number of electrometallurgical products, such, for example, as the crystalline carbids of silicon, titanium and boron and the crystalline aluminous products resulting from the smelting of bauxite and aluminous silicates. Such impurities are usually in the form of carbids and silicides of iron, aluminum and titanium, as well as amorphous material from the unfused part of the charge. These impurities tend to flux the bonding substances used in forming the products into commercial articles, and also have a reducing action on such binders. They are also objectionable for other reasons, and unless removed, the texture and wearing qualities of the articles are varying and ununiform. I have discovered that by mixing such electrometallurgical products with the halid of an alkali or alkaline earth metal, such as sodium chlorid, and subjecting the mixture to heat, the impurities can be largely removed and the articles formed from such products given increased wearing qualities and better uniformity.

As a specific example of my invention, I will now describe the process as applied to the aluminous products resulting from the smelting of aluminous silicates with oxid of iron and carbon, such as disclosed in United States Patent No. 906,172, granted to Frank J. Tone on December 8, 1908. In the process of this patent, the product consists principally of crystalline fused alumina. The ingot of this material is removed from the furnace after cooling and is crushed and screened to the desired sizes and then subjected to a concentration to remove the major portion of the alloy formed. The product is then mixed with sodium chlorid and heated to a temperature of from 800° to 1200° C. After this treatment, the product is preferably washed with water or a dilute solution of a mineral acid, in order to remove any excess of sodium chlorid or products of the reaction. I have found that purification is well effected by adding two to five per cent., by weight, of the sodium chlorid to the fused alumina. In electrometallurgical products of this character, the chief impurities are aluminum carbid and ferro silicon. In treating these products with salt at the temperature stated, I have found indicated that the following reactions apparently take place:—namely, with ferro silicon the reaction may be written;

$$Fe_4Si + 16NaCl \rightleftarrows 4FeCl_3 + SiCl_4 + 16Na \quad (1)$$

In the case of aluminum carbid the reaction may be written;

$$Al_4C_3 + 12NaCl \rightleftarrows 4AlCl_3 + 3C + 12Na \quad (2)$$

My investigations have further indicated that these reactions are reversible, at high temperature going from left to right and at a lower temperature from right to left. As is well known in the case of reversible reactions, an equilibrium is established at each temperature depending on the relative concentrations of the different members of the reactions. If, however, one of the members be removed from the sphere of action, the equilibrium is disturbed, and thus causes a reaction to take place. Hence, if in equation (1) ferric chlorid or silicon tetra-chlorid or sodium is removed in any manner, the equilibrium is disturbed and fresh quantities of these materials are formed. Under ordinary conditions the removal of all these materials is easily effected since at the temperature of the reaction these materials are volatile. Under these conditions the products on the right hand side of the equation volatilize, more ferric chlorid, silicon tetra-chlorid and sodium are formed, and the reaction can be carried out progressively until all the ferro silicon is decomposed. It is possible to remove the products of the reaction from left to right in both equations (1) and (2) by causing some agent to be present which will react on these substances and remove them from the sphere of action. If for instance, oxygen is introduced, it combines with the sodium in the reaction, represented in (1) and the sodium and carbon in equation (2); these materials are, therefore, removed from the sphere of action, the equilibrium is thereby disturbed and this induces the reaction to take place from left to right until all the impurities are decomposed.

From the above it is apparent how the impurities are removed and an explanation is given of the advantage found by the treatment of electro-metallurgical products with sodium chlorid in the presence of oxygen. However, if ferro silicon or aluminum carbid be heated in the presence of sodium chlorid in a non-oxidizing or even a reducing temperature, the reactions shown in equations (1) and (2) take place, and if the volatilization of the products of the reaction from left to right takes place it is possible to completely remove these impurities.

Other salts than sodium chlorid may be used for the purpose of my invention, and I have found that the reaction can be carried out or the desired result obtained by the use of the halid compounds of an alkali or alkaline earth metal. I intend to cover such compounds by the use of the words "salt of an alkali" in my claims.

The advantages of my invention will be obvious to those skilled in the art, since much more uniform articles are obtained and the toughness and wearing quality is improved.

Changes may be made in the products treated, the method of binding, etc., without departing from my invention.

I claim:

1. The process of treating electrometallurgical products used for abrasive or refractory purposes, which consists in heating such products with the halid of an alkali or an alkaline earth metal, substantially as described.

2. The process of treating electrometallurgical products used for abrasive or refractory purposes, which consists in heating such products with sodium chlorid, substantially as described.

3. The process of treating electrometallurgical products used for abrasive or refractory purposes, which consists in heating such products with sodium chlorid and then removing the reaction products formed by the impurities and the sodium chlorids, substantially as described.

4. The process of treating electrometallurgical products, which consists in heating said products with a halid under oxidizing conditions, forming chlorids of the impurities, removing the impurities and then bonding the products, substantially as described.

5. The process of treating crystalline fused alumina-containing impurities, which consists in heating the same with sodium chlorid and removing the reaction products formed by the impurities and the sodium chlorid, substantially as described.

6. The herein described process of treating impure crystalline alumina, which consists in heating the same with the salt of an alkali in the presence of oxygen; substantially as described.

7. The process of treating impure crystalline alumina, which consists in heating same with sodium chlorid in the presence of oxygen; substantially as described.

In testimony whereof, I have hereunto set my hand.

THOS. B. ALLEN.

Witnesses:
L. B. COULTER,
P. B. MANLEY.